Patented June 1, 1937

2,082,087

UNITED STATES PATENT OFFICE 2,082,087

MINERAL DYE LIQUOR AND METHOD

Clarence B. White, Montclair, N. J.

No Drawing. Application October 25, 1935,
Serial No. 46,741

6 Claims. (Cl. 8—5)

This invention relates, generally, to dyes, and the invention has reference, more particularly, to a novel mineral dye liquor and method of producing the same, the said dye liquor being especially suitable for dyeing cotton and other fabrics.

In mineral dyeing, i. e. the production of mineral khaki and its wide range of derivative shades, the dyeing material heretofore generally used has been "black iron liquor" which, because of its production through the action of pyroligneous acid on scrap iron, is frequently also designated as pyrolignite of iron. Pyroligneous acid being an impure form of acetic acid and containing various benzenoid derivatives such as pyrocatechin, pyrogallol, hydroquinone and other oxybenzenes and their methyl esters, upon reacting with the iron produces, in addition to ferrous acetate, a number of impurities including oxy-benzenes that are most sensitive to oxidization of all of the members of the benzene ring derivatives and it is for this reason that they act strongly to stabilize the otherwise exceedingly unstable ferrous acetate. Because of this stability of the ferrous acetate brought about by the presence of oxy-benzene derivatives, pyrolignite of iron is a satisfactory dyeing compound. However, the production of pyrolignite of iron is rather costly and tedious and hence a desirable substitute for this material has long been sought.

The principal object of the present invention is to provide a desirable substitute for pyrolignate of iron which substitute cannot only be produced at considerably less expense than pyrolignate of iron, but which is even more effective than the latter in use.

Another object of the present invention lies in the provision of a relatively simple method of producing a novel mineral dye liquor, the said method employing cheap raw materials such as commercial ferrous sulphate and crude acetate of lime, or similar crude acetate capable of forming an insoluble sulphate with sulphuric acid.

Still another object of the present invention is to provide a novel method involving the use of a solvent or solvent mixture that is miscible in water and which will dissolve the benzol derivatives produced during the method whereby such benzol derivatives are rendered effective to stabilize the resultant dye liquor.

Other objects of the invention will appear as the description proceeds.

Heretofore, it has been impossible to use commercial ferrous sulphate and crude acetate of lime, or similar crude acetate in the production of a dye liquor because of the complex nature of the benzenoid derivatives contained in the crude acetates and their relative insolubility in aqueous solutions, the benzene compounds which accompany crude acetates being generally of a more complex nature and higher distillation points than those which are found in the so-called pyroligneous acid. Moreover the particular benzene derivatives which accompany and enter into the composition of crude acetates, including tar, tar oils, creosote and similar combinations are, in general, but slightly soluble in water, so that it is difficult to incorporate them in an aqueous solution of ferrous acetate in the proper proportion, if at all, to approximate the general composition of pyrolignate of iron, and thereby avail of their stabilizing influence on ferrous acetate. Still another difficulty is encountered in the fact that commercial ferrous sulphate, generally known as copperas, oxidizes readily in the air with the production of a basic sulphate of iron, i. e. a ferric salt, the typical reaction being as follows:—

$$10FeSO_4 + 5O = Fe_4SO_9 + 3Fe_2(SO_4)_3$$

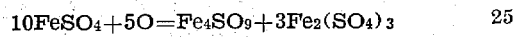

When ferric sulphate or basic ferric sulphate reacts with an acetate, water insoluble basic ferric acetate is formed so that in so far as the oxidation of the ferrous sulphate to ferric sulphate has proceeded, the iron thus far oxidized is lost in so far as the iron liquor produced by the reaction is concerned, i. e. where reliance is placed solely upon an aqueous solvent alone.

In carrying out the present invention the successful treatment of ferrous sulphate (copperas) by means of crude calcium acetate is accomplished by the use of a proper solvent or solvent stimulant both for the water insoluble benzene derivatives which exert a stability influence over ferrous acetate, as well as for the water insoluble iron compounds that are formed as a normal product of the reactions involved.

Crude acetate of lime consists principally of about 80% acetate of calcium, and variable quantities of derivatives of the benzene series, i. e. oxy-benzenes and their methyl esters. In the main these are the di-oxy-benzenes, pyrocatchin, resorcinol, hydroquinone; tri-oxy-benzenes such as pyrogallol and their various methyl esters, such as guaiacol and also creosote composed mainly of cresol, guaiacol and phlorol. Inasmuch as a certain percentage of these benzol derivatives is absolutely essential in achieving stability of ferrous acetate and as these derivatives are substantially insoluble in aqueous solution of ferrous acetate, a problem is presented which I have solved by employing a solvent or solvent stimulant for these benzol compounds, which solvent means not only acts to retain these derivatives permanently in solution with the ferrous acetate but also serves to dissolve the insoluble iron compounds formed during the reaction. The benzene compounds here involved are generally soluble in alcohol, ether, glycerine and oils and in fatty acids. However, oils are not compatible with aqueous solutions, and fatty acids with the exception of the lower members of the series, such as acetic and formic acids, are incompatible with aqueous solutions of metallic salts because of the tendency to form insoluble metallic soaps, while ethers are generally insoluble in water. Solution of these hydrocarbons may be effected by the use of esters, the water breaking the ester down into the corresponding acid and alcohol, either or both of which is a hydrocarbon solvent. On the other hand, the insoluble compounds of iron are soluble in the alcohols, acids in general and the lower fatty acids in particular, examples of which are found in formic and acetic acids, and these in turn are compatible with aqueous solutions, and consequently available.

Heretofore, attempts to produce a useful pyrolignite of iron by means of the double decomposition of ferrous sulphate by means of crude acetate of lime have been unsuccessful because of the rapid oxidization of the ferrous acetate $Fe(C_2H_3O_2)_2$ formed to an insoluble ochreous deposit or sludge whose formula is

$$Fe_2(H_3C_2O_2)_2Fe_2O_3$$

which, because of its high iron content and rapid formation, quickly exhausts the ferrous acetate solution of its available iron content. The major part of the benzene or oxy-benzene compounds derived from the crude acetate of lime are not available to act in the capacity of stabilizers of ferrous acetate because these stabilizing compounds do not dissolve in sufficient quantity in aqueous solution to fulfill their mission as stabilizers. Dye liquors produced thusly contain but a fractional part of the ferrous acetate originally produced while the insoluble residue consists, not only of calcium sulphate, but also of large quantities of insoluble iron compounds and the major portion of the benzene derivatives that were contained in the crude acetate of lime.

The present invention remedies this uneconomical condition and not only effects a large yield of economical dye liquor but also provides a dye liquor sufficiently stable to satisfy the requirements of commercial dyeing of the said dye liquor being exceedingly cheap in cost. This desirable result is obtained by adding to the solution of ferrous sulphate and crude acetate of lime a solvent or solvent stimulant capable of dissolving and holding in solution the requisite quantity of benzene and oxybenzene compounds and derivatives to insure stabilizing of the resulting iron liquors, as well as solvents of insoluble iron compounds that may result either from impurities in the reacting compounds, or as products of the oxidation of soluble iron compounds during the reaction. After considerable research I have found that suitable solvents, which must also be compatible and miscible with aqueous solutions, are the lower fatty acids which do not form insoluble metallic soaps with iron, alcohols and esters, as well as certain mineral acids and glycerine. For solution of the insoluble iron compounds, formic and acetic acids are desirable.

In carrying out the process of the present invention, when I desire to use acetic acid as the solvent stimulant, I may place 500 gals. of water at ordinary temperature in a solution tank provided with an agitator. To this water I add from 2 to 5% of sulphuric acid and start the agitator. I then add 800 lbs. of crude acetate of lime and the whole dissolved under agitation. I then gradually add 1250 lbs. of copperas (ferrous sulphate), the agitation being continued, both during the solution of the copperas and for some time thereafter.

The solution now contains ferrous acetate, ferric acetate, a certain amount of benzene stabilizing derivatives, and an excess of acetic acid that has replaced the sulphuric acid, the latter being precipitated as insoluble sulphate of lime, a by-product of the reaction. There also remains additional precipitate which in addition to insoluble calcium sulphate still retains a substantial quantity of benzene derivatives, as well as insoluble iron salts. So much of the benzene derivatives remain that the whole mass quickly turns black because of oxidation of the benzene derivatives and the release of tar bodies. It is useless to wash this sediment or precipitate with plain water, in which both the greater part of the retained iron compounds and the benzenoid compounds are insoluble. This first batch of dye liquor is treated if necessary with additional calcium salt or its equivalent to remove any possible free sulphuric acid and is thereafter usable, the acetic acid serving as the solvent stimulant for the benzene derivatives retained.

The insoluble precipitate from the above operation is added to approximately 500 gals. of water acidulated to the extent of 2 to 5% with sulphuric acid and thoroughly agitated in a tank. The solution formed contains the balance of the hitherto insoluble iron compounds, benzoid compounds and a considerable excess of sulphuric acid. The precipitate which has now become a dirty gray in color because of the extraction of benzene and iron compounds is separated from the liquid by means of filtration and discarded. The solution which contains the balance of the iron and benzene compounds acidulated with sulphuric acid is now pumped into the regular solution tank to serve the purpose of dissolving a fresh quantity of crude calcium acetate, i. e. about 850 lbs. to which is added a fresh batch of copperas (1250 lbs.), the latter being in sufficient amount to convert all of the calcium acetate into calcium sulphate, leaving no free sulphuric acid present. The solution thus formed, which is the dye liquor, contains ferrous acetate, ferric acetate, ample stabilizing benzene compounds, and an excess of acetic acid which acts as the final solvent or solvent stimulant. The precipitated matter is again treated with acidulated water as before and the process continued indefinitely.

The procedure and the cycle of operations above explained is also followed when formic or acetic acids are used in place of sulphuric acid. I have also found that I may use hydrochloric acid in lieu of sulphuric acid but since the calcium chloride formed remains in solution the same complicates the subsequent dyeing operation. Instead of using sulphuric acetic or formic acids I may use alcohols as the solvent stimulant, the cycle of operations remaining the same.

When using alcohol, such as ethyl or methyl alcohol, as the solvent stimulant, however, I employ an aqueous solution containing from 5 to 15% of alcohol instead of from 2 to 5% solvent stimulant as in the case of acids.

It will be noted that every batch of the dye liquor with the exception of the first is of fairly uniform composition, the whole scheme being a perfect cycle of operations, which described briefly consist in firstly; decomposing mixed solutions of crude calcium acetate and copperas in an aqueous solution containing an acid or alcohol medium in the proportions noted, which results in an insoluble sludge on the one hand consisting of undissolved benzenoid compounds, iron compounds and calcium sulphate, while on the other hand there is formed a liquid which consists of ferrous acetate, ferric acetate and benzene compounds and which liquid contains an excess of solvent stimulant such as acetic acid, and secondly; extracting the sludge with an aqueous solution containing acid or alcohol (2 to 5% of the former or 5 to 15% of the latter) and using the liquor thus obtained to dissolve the next batch of crude acetate of lime, preparatory to repeating the operation.

By thusly causing the reaction between the crude calcium acetate and commercial copperas to take place in the presence of a solvent or solvent stimulant capable of effecting the solution and holding in solution of heavy benzene hydrocarbons such as creosote, cresols, tar oils, etc., as well as iron compounds otherwise insoluble in the liquor, a complete solution of iron salts is obtained which contains sufficient, or even more than sufficient proportions of benzene hydrocarbons of reducing characteristics to effectively stabilize the iron solution and prevent its oxidation into an insoluble sludge. The presence of these heavy benzene hydrocarbons, mostly polyphenols and their methyl esters and ethers, as well as creosotic compounds and cresols, results in a very stable solution that is markedly more stable than the pyrolignite of iron liquor heretofore generally used and containing but a limited number of anti-oxidants. These heavy benzene hydrocarbons are also of antiseptic character and hence serve as preservatives of the dye liquor of this invention. This dye liquor differs from pyrolignite of iron not only in that it has a considerably higher soluble iron content but the said liquor is of different color and appearance besides containing a far larger percentage of benzene derivatives of different composition and character from those present in pyrolignite of iron. The novel dye liquor of this invention is far more stable than pyrolignite of iron but at the same time frequently suffers from the disadvantage of being so heavily charged with tar-like hydrocarbons of benzene derivation that the latter, especially in warm weather and during use in dyeing, have a tendency to separate out as a black, tar-like pitch, which deposits black ineradicable tar stains on the fabric under process. This disadvantage which seems not to exist in the case of pyrolignite of iron can, however, be completely overcome by the application of a proper agent, and the apparent disadvantage turned into a very valuable characteristic.

Crude acetate of lime as purchased in the open market is subject to considerable variation in the percentage of impurities contained, the variation being due largely in the presence of heavier or lighter content, as the case may be, of creosote, cresols, tar and other benzene ethers or esters. However, these compounds are easily susceptible of oxidation into the corresponding carboxylic acid, thereby providing a method of controlling the content, or at least the conditions surrounding the presence of hydrocarbon compounds derived from this source. Thus, when an oxidizing agent, for example, an alkaline perborate, chlorate or bichromate is added to the dye liquor produced according to the method of this invention, i. e. in those cases where the crude calcium acetate used carries an excessive proportion of tar like bodies, such reaction taking place in the precence of a solvent of these bodies, the dark, occasionally murky liquor, clears up and becomes markedly reddish in tone and color. The liquor now ceases to release black tar bodies, the foaming tendency is greatly reduced or practically disappears and the solution becomes limpid, due to the formation of carboxylic acids such as benzoic and phthalic acids and their congeners, the liquor becoming much more antiseptic than in the case of pyrolignite of iron. The stability of the liquor is even enhanced resulting in very even shades.

The heavy benzene hydrocarbons present in the dye liquor of this invention not only act as stabilizers through inhibiting oxidation of the ferrous acetate, but these hydrocarbons also stabilize other relatively unstable iron salts such as ferrous sulphate, ferrous chloride and the like, and at the same time they seem to markedly reduce any existing tendency to hydrolysis with its accompanying release of acids or acid radicals which would exert a damaging action upon the fabric under process.

It has been found possible, on occasion, to add ferrous sulphate to the dye liquor of this invention to the extent of about forty percent of the existing iron content of the liquor without thereby creating a condition of instability that would otherwise result in a damaging amount of oxidation and/or hydrolysis. Ferrous sulphate is an exceedingly cheap source of iron salts and the ability to make use of this material in its raw state enables the production of the dye liquor of this invention at a very low price while at the same time obtaining a superior product in many of its characteristics to the well known pyrolignite of iron.

To dye a textile fabric with the novel dye liquor of this invention it is merely necessary to pass the fabric once through the dye liquor, dry the same, and thereafter pass the thusly impregnated fabric through a hot alkaline insolubilizing bath, thereby removing the acid radical from the absorbed iron salt and converting the soluble iron salt into an insoluble salt or dye that thoroughly and permanently coats the fibres of the fabric. The heat of the insolubilizing bath serves to drive off the more volatile of the benzene derivatives.

What I claim is:

1. In the preparation of a mineral dyeing composition, the steps comprising, the double decomposition of ferrous sulphate by means of crude acetate of lime in the presence of a solvent stimulant capable of dissolving benzene derivatives contained in the crude acetate of lime, thereby producing a solution of iron salt and hydrocarbon derivatives of the benzene series.

2. In the preparation of a mineral dyeing composition the steps comprising, reacting crude calcium acetate with ferrous sulphate in the presence of an acid solvent stimulant of the group consisting of sulphuric, formic and acetic acids, for the heavy benzene derivatives contained in the crude calcium acetate.

3. In the preparation of a mineral dyeing composition the steps comprising, reacting a solution of ferrous sulphate with crude calcium acetate in the presence of alcohol serving as a solvent stimulant for the heavy benzene derivatives contained in the crude calcium acetate.

4. In the preparation of a mineral dyeing composition the steps comprising, reacting a solution of ferrous sulphate with crude calcium acetate in the presence of dilute lower acids of the fatty acid series serving as a solvent stimulant for the heavy benzene derivatives contained in the crude calcium acetate.

5. In the preparation of a mineral dyeing composition, the steps comprising, the double decomposition of ferrous sulphate by means of crude acetate of lime in the presence of a solvent stimulant capable of dissolving benzene derivatives contained in the crude acetate of lime, thereby producing a solution of iron salt and hydrocarbon derivatives of the benzene series, and treating said solution with an oxidizing medium capable of partially oxidizing the heavy benzene derivatives.

6. In the preparation of a mineral dyeing composition, the steps comprising, the double decomposition of ferrous sulphate by means of crude acetate of lime in the presence of a solvent stimulant capable of dissolving benzene derivatives contained in the crude acetate of lime, thereby producing a solution of iron salt and hydrocarbon derivatives of the benzene series, and treating said solution with an alkali metal chlorate to effect partial oxidation of the benzene derivatives to clarify the solution.

CLARENCE B. WHITE.